United States Patent [19]

Alvarez et al.

[11] Patent Number: 5,167,889
[45] Date of Patent: Dec. 1, 1992

[54] PROCESS FOR PRESSURE SINTERING POLYMERIC COMPOSITIONS

[75] Inventors: Edwardo Alvarez; Todd E. Andres, both of Houston, Tex.

[73] Assignee: Hoechst Celanese Corp., Sumerville, N.J.

[21] Appl. No.: 712,362

[22] Filed: Jun. 10, 1991

[51] Int. Cl.$^5$ ............................................. B29C 43/02
[52] U.S. Cl. .................................. 264/120; 264/126; 264/320
[58] Field of Search ............... 264/120, 122, 125, 126, 264/127, 320; 419/49

[56] References Cited

U.S. PATENT DOCUMENTS

| | | | |
|---|---|---|---|
| 4,055,615 | 10/1977 | Ikeda | 264/127 |
| 4,353,855 | 10/1982 | Garabedian | 264/126 |
| 4,499,049 | 2/1985 | Hanejko | 419/49 |
| 4,518,441 | 5/1985 | Hailey | 419/49 |
| 4,539,175 | 9/1985 | Lichti | 419/49 |
| 4,640,711 | 2/1987 | Lichti | 75/248 |
| 4,717,535 | 1/1988 | Adlerborn et al. | 419/49 |
| 4,814,530 | 3/1989 | Ward | 528/342 |
| 4,847,021 | 7/1989 | Montgomery et al. | 264/29.3 |
| 4,853,178 | 8/1989 | Oslin | 419/23 |
| 4,861,537 | 8/1989 | Ward | 264/126 |
| 4,912,176 | 3/1990 | Alvarez | 525/435 |
| 4,948,869 | 8/1990 | Ogoe et al. | 264/126 |
| 4,997,608 | 3/1991 | Haldeman et al. | 264/120 |

FOREIGN PATENT DOCUMENTS 56-110749  9/1981  Japan .................................. 264/126

OTHER PUBLICATIONS

"Compaction of Polymer Powders" by G. W. Halldin et al. SPE. 39th ANTEC. Boston, Mass.; May 4-7, 1981 pp. 353-355.

Primary Examiner—Mary Lynn Theisen
Attorney, Agent, or Firm—James M. Hunter, Jr.

[57] ABSTRACT

A process for heat treating polymeric compositions into a shaped article comprising the steps of:

a. placing a polymeric composition into a molding means;
b. adding a compactible material to the molding means to surround the polymeric composition;
c. pressuring the molding means containing the polymeric composition to force its particles into intimate contact with the compactible material, and clamping the molding means so as to maintain the pressurized state;
d. heat treating the pressurized molding means containing the polymeric composition to form a densified, shaped article; and
e. releasing the pressure on the molding means and removing the heat treated, shaped article.

24 Claims, 2 Drawing Sheets

PROCESS FOR PRESSURE SINTERING POLYMERIC COMPOSITIONS

1. FIELD OF INVENTION

The invention relates to a process for sintering polymeric compositions. The process can be utilized to sinter preformed polymeric greenbodies, as well as free-flowing polymeric particles into shaped articles.

2. BACKGROUND OF THE INVENTION

Heretofore, metal and ceramic compositions have been sintered into molded articles by processes such as compression molding. Compression molding involves the steps of drying polymeric particulates, placing the particulates into a mold, heating, applying pressure to the heated mold, reducing the pressure to atmospheric conditions, and free sintering. The process often involves repeated heating and pressure steps until the desired article density and shape are obtained followed by free sintering. This process is slow, consumes large amounts of energy and labor, and produces a limited amount of sintered articles.

U.S. Pat. Nos. 4,539,175 and 4,640,711 teach a method of consolidating objects made from metallic, metallic and ceramic composite, and ceramic compositions by employing graphite particulates. The composition to be consolidated, a powdered, sintered, fibrous, sponge or other form capable of compaction, is placed within a contained zone and around it is placed a bed of flowable, resiliently compressible carbonaceous material such as graphite. The contained zone is then heated to a temperature of about 1000° to 4000° C. followed by pressurization of the bed while still hot. After cooling, the consolidated object is removed from the contained zone.

3. SUMMARY OF THE INVENTION

The invention disclosed herein relates to a process for heat treating pressurized polymeric resinous compositions. Among the advantages of the process are the production of finished polymeric articles requiring little to no machining, a high production rate of articles requiring a minimum amount of time, and articles having uniform properties such as density, dimensions, strength and limited shrinkage.

The polymeric resins useful in this invention include, but are not limited to, high molecular weight compositions of polybenzimidazole, polyarylates, aromatic polyimides, aromatic polyamides, aromatic polyimideamides, aromatic poly(ester-amides), etc. The process of this invention can be utilized with any polymeric resinous composition that is capable of being molded, whether it is flowable particulates or preformed, shaped articles sometimes referred to as greenbodies.

The invention is directed to a process for heat treating polymeric compositions into a shaped article including, generally, the steps of:

a. placing a polymeric composition into a molding means;
b. adding a compactible material to the molding means to surround the polymeric composition;
c. pressuring the molding means containing the polymeric composition to force its particles into intimate contact with the compactible material, and clamping the molding means so as to maintain the pressurized state;
d. heat treating the pressurized molding means containing the polymeric composition to form a densified, shaped article; and
e. releasing the pressure on the molding means and removing the heat treated, shaped article.

One embodiment involves sintering polymeric compositions into a shaped article by way of:

a. placing a particulate polymeric composition into a sintering shell;
b. adding a compactible material to the sintering shell separated from the polymeric composition by movable plates;
c. placing the sintering shell into a clamping means;
d. pressuring the clamping means to cause an axial pressure transmission from the clamping means to the compactible material to the polymeric composition by way of the sintering shell;
e. sintering the pressurized particulate polymeric composition; and
f. releasing the pressure on the clamping means and removing the sintered, polymeric shaped article from the sintering shell.

In another embodiment, polymeric compositions are processed into a shaped article by way of:

a. forming a self-standing, shaped greenbody of particulate polymeric material;
b. placing the shaped greenbody into a sintering shell which is shaped to receive at least one pressure-transferring member;
c. surrounding the greenbody with a compactible material;
d. applying pressure to the compactible material by way of the pressure transferring member which in turn is isostatically applied to the greenbody by the compactible material;
e. clamping said pressure-transferring member into a position that maintains the pressure; and
f. applying heat so as to isostatically sinter said greenbody to a densified shaped article.

In accordance with the invention, numerous shaped articles can be produced at one time. Hundreds of preformed shaped articles are capable of being placed into a single sintering shell-clamping means and heat treated together in a single oven without the need for sophisticated and expensive presses.

4. DESCRIPTION OF THE DRAWINGS

5. DETAILED DESCRIPTION OF THE INVENTION

Figure 1:
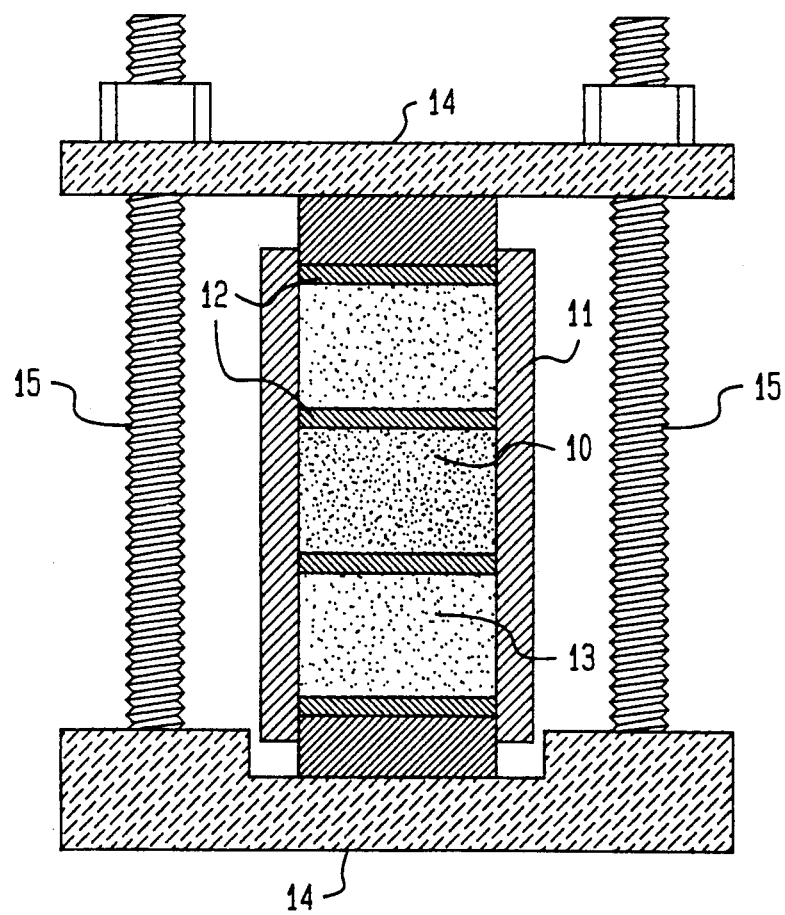
FIG. 1 is the front view in elevation and section of the heat treating system utilized for molding polymeric particulate compositions using a molding or sintering shell to apply an axial pressure to make, for example, a single solid cylinder.

The invention described herein is a process for heat treating polymeric resinous compositions under pressure utilizing a clamping, heat treating system. Generally, any polymeric material that is heat treatable can be utilized in the inventive process described herein. Typically, high molecular weight polymers such as polybenzimidazoles, aromatic polyamides, aromatic polyimides, polyaryletherketones, aromatic polyarylates, aromatic polyester, aromatic poly(ester-amides), polytetrafluorethylenes, etc., and mixtures thereof are suitable for heat treating by the process described herein. However, the process is suitable for any polymeric composition that is shapable and heat treatable.

The polymeric composition utilized in the process of the invention can be in the form of particulates or preformed shaped articles (i.e., greenbodies). When a polymeric particulate composition is utilized, the particle size is generally in the range of approximately 50 to approximately 400 μm, typically in the range of approximately 100 to 350 μm, and preferably in the range of approximately 150 to approximately 250 μm. The particulates can contain small amounts of moisture, generally up to approximately 5 percent by weight, typically the particulates should contain less than approximately 1 percent by weight of moisture, and in most cases the particulates should contain no moisture.

Preformed polymeric compositions utilized by the invention are generally produced by the process of cold compaction or direct forming. Cold compaction involves the conglomeration of polymeric particulates at ambient temperatures. The particulates are placed in a mold and pressurized to forces in the range of approximately 2 to approximately 50 kpsi for a time ranging from approximately 1 to approximately 60 seconds. These preformed compositions should be dried prior to initiating the inventive process described herein.

In one embodiment, the heat treating system comprises a sintering shell having the desired shape of the finished shaped article and a clamping means. There should be at least one opening in the sintering shell to load the polymeric composition and to apply a force therethrough to the polymeric composition. Typically, the sintering shell is a cylindrical duct having a first and second opening, and is constructed from metal alloys, ceramics or a substance that will withstand high temperatures. End plates or disks generally constructed of metal alloys or ceramics are movably positioned in the duct to enclose the polymeric composition within the sintering shell, and separate it from the resilient, compactible material.

A flowable resilient, compactible material, generally ceramic, glass, carbonaceous particulates, or mixtures thereof is packed around the polymeric composition to act as a pressure transmitting medium. Typically, the carbonaceous composition is selected from petroleum coke and graphitic beads. Petroleum coke manufactured by Superior Graphite under the brand name Graphite 9400 TM has been found to be a suitable compaction material. Graphitic beads will preferably have outwardly projecting nodes, spheroidical morphologies, and particle size ranges from approximately 50 to 300 mesh. Several advantages can be obtained by the use of graphitic beads. These advantages include non-abrasiveness, non-agglomeration, elasticity, and good heat transfer properties. The beads are stable, non-oxidizing at high temperatures, and reusable for numerous sintering cycles. Graphite allows equal pressure distribution on the polymeric composition, enables significant pressure reduction during the pressurization step, and prevents oxidation of the polymeric composition.

The clamping means of the invention is utilized to hold a constant pressure on the molding means and maintain that pressure through heat treatment. The clamping means comprises two slidably opposed base plates having raised surfaces held together by threaded-nut and bolt combinations place therethrough. A pressure applied against the base plates to force them inward can be secured by tightening the nut and bolt combinations, i.e., locking means. The clamping means can be constructed of any material that will maintain pressures at temperatures of the magnitude disclosed herein.

The term heat treating, as will be apparent to those skilled in the art, refers to any process in which heat or radiation is transmitted to the polymeric composition by direct or indirect methods, and can include but is not limited to sintering, curing, kilning, baking, radiating, etc. Preferably, the heat treating temperatures and times will be of sufficient magnitude to produce non-decomposable shaped article, i.e., sintering conditions.

Referring to FIG. 1, the polymeric composition (10) in the form of particulates is placed into the molding means or sintering shell (11) followed by, optionally, placing end plates (12) on each side of the composition. Next, the flowable resilient, compactible material (13) is placed in the molding means. Optionally, additional end plates can be placed over the resilient, compactible material to prevent any loss of material from the molding means. Thereafter, the molding means (11) containing the aforementioned components is placed into a clamping means comprising slidingly opposed base plates consisting of a first base plate having a raised surface (14) and second base plate having a raised surface (14) connected by locking means (15) in such a way that the base plates raised surfaces slidably contact the resilient, compactible material or optional end plates. An axial pressure is placed against the base plates to force the raised surfaces to slide inward and cause a pressure transmission to the polymeric material. The pressure is held constant by locking means (15), and the heat treating system is placed into an oven containing an air or inert gas atmosphere such as nitrogen, argon, etc., at the desired temperature for the desired time. Upon completion of the heat treating step, the pressure of the molding means is reduced to atmospheric conditions, the clamping means is disassembled, the molding means withdrawn therefrom, and the heat treated, shaped polymeric article is removed. During the process, the polymeric composition is compacted by a pressure transmission from the pressuring means to the clamping means to the resilient, compactible material to the polymeric composition by way of the molding means. The process utilizes pressures ranging from approximately 2 to approximately 60 ksi, heat treating temperatures ranging from approximately 200° to approximately 700° C., and heat treating times ranging from approximately 5 to approximately 10 hours.

Figure 2:
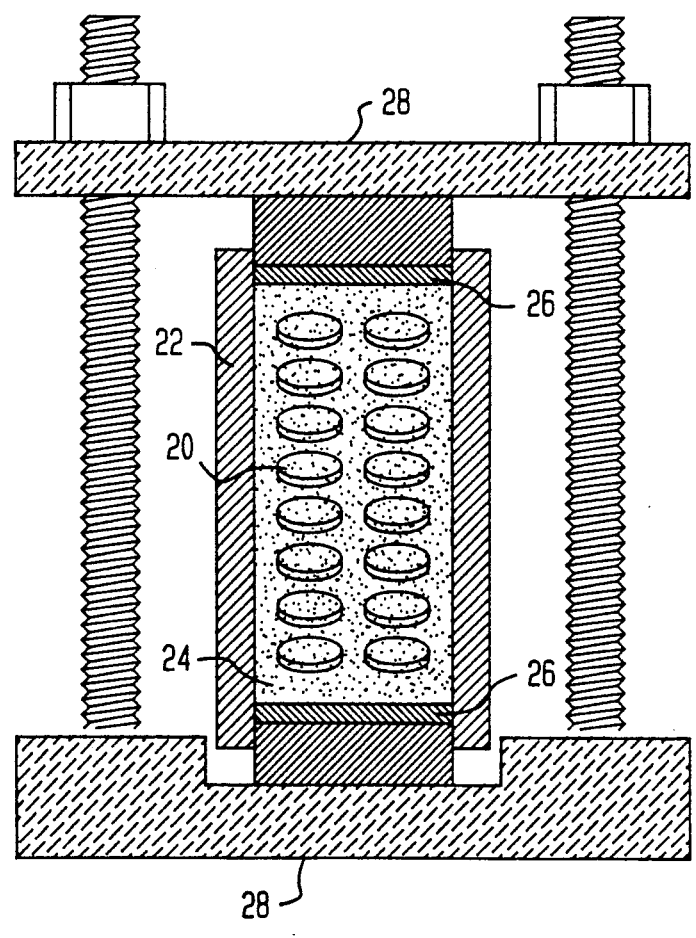
FIG. 2 is the front view in elevation and section of the heat treating system utilized for molding performed polymeric shapes or greenbodies into sintered articles by isostatically pressing them.

FIG. 2 illustrates a typical molding means and clamping means for pressurizing and heat treating preformed polymeric compositions. Several performed polymeric shaped articles (20) can be placed in a single molding means (22) by stacking the articles using the technique of alternating a layer of resilient, compactible material (24) with a layer of preformed articles (20), and placing end plates (26) over a final layer of resilient, compactible material. Thereafter, the molding means (22) is placed into clamping means (28), pressurized, and heat treated.

Advantageously, tens, hundred or thousands of articles can be sintered in each clamping means. Numerous clamping means can be placed in a heat treating oven for processing together. This process allows a multitude of heat treated, polymeric shaped articles having uniform properties to be produced at one time, thus reducing the process time and costs over prior art methods.

Various fillers can be mixed with the polymeric compositions before preforming and particulate shaping. These fillers include but are not limited to graphite, glass, metals, ceramics, polytetrafluoroethylene, etc. Any material which enhances the properties of the polymeric composition can be utilized as a filler.

The following examples serve to illustrate the process of this invention, as will become apparent to those skilled in the art, but are not meant to limit the inventive concept described herein.

EXAMPLE I

Isaryl 25X, manufactured by Isonova Technische Innovationen Ges.m.b.H., Austria, is a polyarylate powder of high molecular weight synthesized from HDPE monomer. The polarylate powder exhibited an inherent viscosity of 0.5 dl/g, average molecular of 50,000, grain size of 50 to 400 $\mu$m, and an apparent density of 0.3 g/cm$^3$. The polyarylate was placed into a 2.5 in. I.D. ×4.0 in. long mold with end-plates on each side, as illustrated in the apparatus of FIG. 1, and compacted to 5 kpsi. After releasing the pressure, Superior Graphite's Graphite 9400 TM grade graphite was then placed on each side of the enclosed polymeric resin composition. Additional end-plates were placed on each side of the graphite. The loaded mold was placed onto the clamping means. The entire heat treating systems were placed on a press and compacted to a pressure of 5 kpsi. Thereafter, the nut and bolt means were sufficiently tighten to maintain the 5 kpsi pressure. The heat treating system was placed into an air atmosphere oven at 260° C. for 10 hours.

Upon removing the shaped Isaryl 25X bar from the mold, it appeared to be fully sintered and showed no signs of porosity.

Tensile strength tests were performed on the bar in accordance with ASTM No. D638. This data is illustrated in Table I for comparison with data from Isaryl 25X bars produced by conventional compression molding by the product manufacturer.

EXAMPLE II

Polybenzimidazole powder manufactured by Acurex Corporation was molded into test bars utilizing the apparatus of FIG. 1 and the process of the invention by compacting to 10 kpsi, and sintering at 477° C. for 7 hours. The test results, reported in Table IV, indicate a tensile strength of 31.3 ksi, an elongation of 4.1%, and a modulus of 963.01 ksi. Polybenzimidazole powder having a size of 100 mesh and an inherent viscosity of 0.61 dl/g was process under conditions similar to that of Example I except the compacting pressure was 10 kpsi and the sintering time was 7 hours.

EXAMPLE III

Polybenzimidazole fibrid powder having an inherent viscosity of 0.78 dl/g was compacted at 15 kpsi to produce several disk shaped articles. The "greenshapes" were dried in a convection oven at 200° C. for 16 hours, and placed into a mold. Graphitic material was placed around each disk as illustrated in FIG. 2. End-plates were placed over each end of the mold, and the mold was placed onto the clamping means. A pressure of 10 ksi was applied to the system and locked therein. Thereafter, the system was placed into an oven at 477° C. for 7 hours. The sintered polybenzimidazole disks exhibited a tensile strength of about 35 kpsi and an elongation of about 4%.

EXAMPLE IV

A 3.5 gm. sample of fibrid polybenzimidazole was placed into a cylindrical mold. End plates which resemble pistons were snugly inserted into opposite ends of the cylinder to compact the polybenzimidazole. A pressure of 65,000 psig was placed on the sample for 60 seconds to fully compact it. Ten of these 'greenshape' disks were produced by this method. After drying for 2 hours at 390° F., the disks were placed in a mold as illustrated in FIG. 2 and sintered at 890° F. for 3 hours. The disks were slowly cooled and removed from the mold.

EXAMPLE V

Atomized polybenzimidazole powder containing 7% moisture was cold compacted at 15 kpsi and ambient temperature into the shape of a disk. The greenbody was dried in a convection oven at 200° C. for 16 hours. This greenbody was placed into a mold, surrounded by Graphite 9400 TM, the mold was placed into the clamp and pressurized to 10 ksi. The sintering system was placed into an oven at 477° C. for 7 hours. The disk exhibited a tensile strength of 31 kpsi, an elongation of 3.4%, a tensile modulus of 826 ksi, a hardness of 60 RA, and a density of 1.29 g/cm$^3$.

TABLE I

| Molding | Mechanical Properties of Isaryl 25X | |
|---|---|---|
| | Pressure Sintering avg./max. | Compression avg./max |
| Tensile Strength, ksi | 9.84/13.32 | 7.3/10.4 |
| Elongation, % | 4.02/7.16 | 2.4/4.2 |
| Tensile Modulus, ksi | 395.12/442.74 | 392/406 |

We claim:
1. A process for heat treating a polymeric composition into a shaped article comprising the steps of:
  a) placing a polymeric composition into a molding means;
  b) adding a compactible material to the molding means to surround the polymeric composition;
  c) pressuring the molding means containing the polymeric composition to a pressure ranging from about 2 to about 60 ksi to force said composition into intimate contact with the compactible material, and clamping the molding means so as to maintain the pressurized state;
  d) heat treating the pressurized molding means containing the polymeric composition in an oven to a temperature ranging from about 200° to about 700° C. for about 5 to about 10 hours to form a densified, shaped article; and
  e) releasing the pressure on the molding means and removing the heat treated, shaped article.

2. The process of claim 1 wherein the compactible material is selected from the group consisting of carbonaceous particulates, ceramic particulates, glass particulates, petroleum coke, and mixtures thereof.

3. The process of claim 1 wherein the polymeric composition is selected from the group consisting of high molecular weight polybenzimidazole, polyarylate, polyester, polyimide, polyamide, polyamid-imide, polyether-imide, poly(ester-amide), polytetrafluoroethylene, polyaryletherketone, and mixtures thereof.

4. A process for sintering a polymeric composition into a molded article comprising the steps of:

a) placing a polymeric composition into a sintering shell;
b) adding a compactible material to the sintering shell separated from the polymeric composition by movable plates;
c) placing the sintering shell into a clamping means;
d) pressuring the clamping means to a pressure ranging from about 2 to about 60 ksi to cause an axial pressure transmission from the clamping means to the polymeric composition by way of the sintering shell;
e) sintering the pressurized particulate polymer composition in an oven at a temperature ranging from about 200° to about 700° C. for about 5 to about 10 hours in a sintering atmosphere; and
f) releasing the pressure on the clamping means and removing the sintered, polymeric molded article from the sintering shell.

5. The process of claim 4 wherein the compactible material is selected from the group consisting of carbonaceous particulates, ceramic particulates, glass particulates, petroleum coke, and mixtures thereof.

6. The process of claim 4 wherein the polymeric composition is selected from the group consisting of high molecular weight polybenzimidazole, polyarylate, polyester, polyimide, polyamide, poly(ester-amide), polytetrafluoroethylene, polyaryletherketone, and mixtures thereof.

7. The process of claim 4 wherein the sintering atmosphere is selected from air and an inert gas.

8. The process of claim 4 wherein prior to pressurization, end plates are placed in the sintering shell between the polymeric composition and the compactible material to maintain separation thereof.

9. A process for sintering a polymeric composition into a shaped article comprising the steps of:
a) forming a self-standing, shaped greenbody of particulate polymeric material;
b) placing the shaped greenbody into a sintering shell which is shaped to receive at least one pressure-transferring member;
c) surrounding the greenbody with a compactible material;
d) applying a pressure ranging from about 2 to about 60 ksi to the compactible material by way of the pressure transferring member which in turn is isostatically applied to the greenbody by the compactible material;
e) clamping said pressure-transferring member into a position that maintains the pressure; and
f) isostatically sintering said greenbody in an oven at a temperature ranging from about 200° to about 700° C. for about 5 to about 10 hours to a densified, shaped article in a sintering atmosphere.

10. The process of claim 9 wherein the compactible material is selected from the group consisting of carbonaceous particulates, ceramic particulates, glass particulates, and mixtures thereof.

11. The process of claim 9 wherein the polymeric composition is selected from the group consisting of high molecular weight polybenzimidazole, polyarylate, polyester, polyimide, polyamide, poly(ester-amide), polytetrafluorethylene, polyaryletherketone, and mixtures thereof.

12. The process of claim 9 wherein the sintering atmosphere is selected from air and an inert gas.

13. The process of claim 9 wherein prior to applying pressure, end plates are opposingly, slidably placed into the sintering shell between the polymeric composition and the compactible material thereby separating the polymeric composition from the compactible material.

14. The process of claim 9 wherein a plurality of preformed polymeric compositions are placed into the sintering shell transversely to the direction of the pressure.

15. The process of claim 9 wherein each of the plurality of preformed polymeric compositions is surrounded by the compactible material.

16. A method of consolidating a polymer composition into a densified shaped article comprising:
(a) placing a polymeric composition into a sintering vessel provided with an interior having a lockably adjustable volume;
(b) adding a resilient compactible material to said sintering vessel such that it is in mechanical communication with said polymeric composition;
(c) applying pressure to said sintering vessel so that said polymeric composition and said resilient compactible material are in a pressurized state and said interior volume of said sintering vessel is adjusted to accommodate said pressurized state;
(d) while said polymeric composition and said resilient compactible material are in said pressurized state, locking the sintering vessel so that its interior volume is essentially fixed and said polymeric composition and said resilient material are maintained in said pressurized state upon relaxation of said applied pressure of step c) above; and;
(e) heat treating the sintering vessel in a locked condition so that the pressurized state of said resilient compactible material and said polymeric composition is maintained at substantially constant volume during said heat treatment.

17. The method according to claim 16 wherein said step of applying pressure to said sintering vessel is carried out substantially at room temperature.

18. The process according to claim 16, wherein said pressure ranges from about 2 to about 60 ksi.

19. The process according to claim 16 wherein said heat treatment occurs at a temperature of from about 200° to about 700° C.

20. The process according to claim 16 wherein said heat treatment is carried out from about 5 to about 10 hours.

21. A method of consolidating a polymeric composition into a densified shape article comprising:
(a) placing a polymeric composition into a sintering vessel provided with an interior having a lockably adjustable volume;
(b) adding a resilient compactable material to the sintering vessel separated from said polymeric composition by movable plates such that said composition is in mechanical communication with said plates and said plates are in mechanical communication with said compactible material;
(c) applying pressure to said sintering vessel so that said polymeric composition and said resilient compactable material are in a pressurized state and said interior volume of said sintering vessel is adjusted to accommodate said pressurized state;
(d) while said polymeric composition and said resilient compactible material are in said pressurized state, locking said sintering vessel so that its interior volume is essentially fixed and said polymeric composition and said resilient material are maintained in said pressurized state upon relaxation of said applied pressure of step c) above; and;

(e) heat treating the sintering vessel in a locked condition so that the pressurized state of said resilient compactible material and said polymeric composition is maintained at substantially constant volume during said heat treatment.

22. The method according to claim 21 wherein said step of applying pressure to said sintering vessel is carried out substantially at room temperature.

23. A method of consolidating a polymeric composition into a densified shaped article comprising:

(a) forming a self standing shaped greenbody of a particulate polymeric material;

(b) placing the shaped greenbody into a sintering vessel provided with an interior having a lockably adjustable volume;

(c) adding a resilient compactible material to said sintering vessel such that it surrounds said shaped greenbody;

(d) applying pressuring to said sintering vessel so that said polymeric composition and said resilient compactable material are in a pressurized state and said interior volume of said sintering vessel is adjusted to accommodate said pressurized;

(e) while said shaped greenbody and said resilient compactible material are in said pressurized state, locking the sintering vessels so that its interior volume is essentially fixed so that said polymeric composition and said resilient material are maintained in said pressurized state upon relaxation of said applied pressure of step d above; and;

(f) heat treating the sintering vessel in a locked condition so that the pressurized state of said resilient compactible material and said shaped greenbody is maintained at substantially constant volume during said heat treatment.

24. The method according to claim 23 wherein said step of applying pressure to said sintering vessel is carried out substantially at room temperature.

* * * * *